(12) United States Patent
Xin et al.

(10) Patent No.: US 7,483,577 B2
(45) Date of Patent: Jan. 27, 2009

(54) SYSTEM AND METHOD FOR JOINT DE-INTERLACING AND DOWN-SAMPLING USING ADAPTIVE FRAME AND FIELD FILTERING

(75) Inventors: Jun Xin, Quincy, MA (US); Anthony Vetro, Cambridge, MA (US); Huifang Sun, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 766 days.

(21) Appl. No.: 10/791,203

(22) Filed: Mar. 2, 2004

(65) Prior Publication Data

US 2005/0196052 A1  Sep. 8, 2005

(51) Int. Cl.
G06K 9/36 (2006.01)
G06K 9/46 (2006.01)
H04N 11/20 (2006.01)

(52) U.S. Cl. .............. 382/233; 348/448; 348/451; 348/452

(58) Field of Classification Search .......... 382/233; 348/448, 452, 449, 450, 451
See application file for complete search history.

(56) References Cited

U.S. PATENT DOCUMENTS

| | | |
|---|---|---|
| 4,328,426 A | 5/1982 | D'Ortenzio |
| 4,394,693 A | 7/1983 | Shirley |
| 4,669,100 A | 5/1987 | Slotboom et al. |
| 4,686,580 A | 8/1987 | Kato et al. |
| 4,750,057 A | 6/1988 | Baumeister ............. 360/35.1 |
| 4,800,436 A | 1/1989 | Polaert et al. ............ 358/232 |
| 4,881,125 A | 11/1989 | Krause ...................... 358/141 |
| 5,289,292 A | 2/1994 | Osada et al. |
| 5,335,295 A | 8/1994 | Ferracini et al. |
| 5,574,572 A | 11/1996 | Malinowski et al. |
| 5,748,250 A | 5/1998 | Markandey et al. ........ 348/451 |
| 5,784,115 A | 7/1998 | Bozdagi |
| 6,104,753 A * | 8/2000 | Kim et al. ............ 375/240.16 |
| 6,175,659 B1 | 1/2001 | Huang |
| 6,269,484 B1 * | 7/2001 | Simsic et al. ............ 725/151 |
| 6,442,203 B1 | 8/2002 | Demos |
| 6,493,392 B1 * | 12/2002 | Chung et al. ........ 375/240.27 |
| 6,563,964 B1 | 5/2003 | Hallberg |
| 6,661,464 B1 | 12/2003 | Kokkosoulis et al. ....... 348/448 |
| 6,680,752 B1 * | 1/2004 | Callway et al. ............ 348/448 |
| 6,898,243 B1 * | 5/2005 | Alvarez ................ 375/240.14 |
| 2001/0019630 A1 * | 9/2001 | Johnson ..................... 382/232 |
| 2003/0081144 A1 * | 5/2003 | Mohsenian ................ 348/448 |
| 2004/0126021 A1 * | 7/2004 | Sull et al. .................. 382/233 |
| 2004/0233329 A1 * | 11/2004 | Yeh et al. .................. 348/452 |

FOREIGN PATENT DOCUMENTS

JP  2005278168 A  * 10/2005

* cited by examiner

*Primary Examiner*—Jingge Wu
*Assistant Examiner*—Bernard Krasnic
(74) *Attorney, Agent, or Firm*—Dirk Brinkman; Gene V. Vinokur

(57) ABSTRACT

A method and system processes a compressed input video. The compressed input video is processed to produce an interlaced picture, and macroblock coding information of the input video. The interlaced picture has a first spatial resolution, and a top-field and a bottom-field. The top-field and the bottom-field of the interlaced picture are filtered adaptively according to the macroblock coding information to produce a progressive picture with a second spatial resolution less than the first spatial resolution.

17 Claims, 5 Drawing Sheets

100

SYSTEM AND METHOD FOR JOINT DE-INTERLACING AND DOWN-SAMPLING USING ADAPTIVE FRAME AND FIELD FILTERING

FIELD OF THE INVENTION

The invention relates generally to video processing, and more particularly to de-interlacing and downsampling of interlaced video.

BACKGROUND OF THE INVENTION

In an interlaced video, each frame of the video has two fields. One field includes all even pixel lines of the frame, and the other frame includes all odd pixel lines. Interlacing the two fields together forms the video frame. The two fields are displayed alternatively on an interlaced display for better motion continuity. The majority of consumer TV sets are interlaced display devices. Interlaced video is widely used in terrestrial video broadcasting, cable television (CATV) as well as direct broadcast satellite (DBS) systems. The current digital television broadcasting, and particularly high definition television (HDTV) mainly uses interlaced video. Typical resolutions of digital interlaced video are relatively high, e.g., 720×480 for standard definition TV (SDTV) and 1920×1080 for HDTV.

Portable terminals, including personal digital assistants (PDA) and cell phones, and computer monitors typically use progressive display. In progressive display, all pixel lines of a video frame are displayed sequentially from top to bottom. In addition, many progressive displays, PDA and cell phones in particular, have limited display capability, e.g., 320×240 is currently the high-end display for PDA, and cell phone display resolution generally is even smaller.

MPEG-2 is a video coding standard currently used by broadcasting industry. This standard is capable of efficiently representing high-resolution digital video, both interlaced and progressive.

MPEG-2 video is usually encoded using 'frame pictures', where the two fields are coded together. The MPEG-2 syntax also supports coding of 'field-pictures' where the fields are coded separately as field pictures. We use MPEG-2 frame-picture in the following descriptions, but the description also applies to field-picture.

The MPEG-2 video-coding process operates on video frames represented in the YCbCr color space. If images are stored in a 24-bit RGB format, then the images must first be converted to the YCbCr format. Each video frame is divided into non-overlapping macroblocks. Each macroblock covers a 16×16 pixels. Each macroblock includes four 8×8 luma (Y) blocks, and two corresponding 8×8 chroma blocks (one Cb block and one Cr block). Macroblocks are the basic units for motion compensated prediction (MCP), and blocks are the basic units for applying discrete cosine transform (DCT).

There are three types of frames in the MPEG-2 video: intra-frames (I-frames), predicted frames (P-frames), and bi-directional predicted frames (B-frames). An I-frame is coded independently without referring to other frames. A macroblock in an I-frame can use either frame-DCT or field-DCT. A P-frame is coded relative to a prior reference frame. A macroblock can be coded as an intra-macroblock or an inter-macroblock. An intra-macroblock is encoded like a macroblock in an I-frame.

An inter-macroblock can be frame-predicted or field-predicted. In frame-prediction, the macroblock is predicted from a block in the reference frame positioned by a motion vector. In field-prediction, the macroblock is divided into two 16×8 blocks, one block belongs to the top field, and the other block belongs to the bottom field. Each 16×8 block has a field selection bit, which specifies whether the top or the bottom field of the reference frame is used as prediction, and a motion vector, which points to the 16×8 pixel region in the appropriate field. A macroblock can be skipped when it has a zero motion vector and all-zero error terms.

A B-frame is coded relative to both a prior reference frame and a future reference frame. The encoding of a B-frame is similar to a P-frame, except that the motion vectors can refer to areas in the future reference frame.

Typically, for display on progressive portable devices, MPEG-2 coded video needs to be transcoded to a format optimized for low-resolution progressive video such as MPEG-4 simple profile (SP).

Two problems arise when MPEG-2 coded interlaced video is transcoded to a low-resolution progressive video like MPEG-4 SP, or when it is to be displayed on low-resolution progressive display. One problem is due to well-known interlacing artifacts, including aliasing, saw-tooth type edge-distortion and line flicker. The other problem is due to a resolution mismatch. De-interlacing and downsampling filtering are conventional techniques to solve the two problems.

Basic de-interlacing methods include "weave," "bob," "discard," and "adaptive," as in U.S. Pat. Nos. 4,750,057, 4,800,436, 4,881,125, 5,748,250, and 6,661,464. The "weave" method only interlaces the two fields of a frame together. The processed video has interlacing artifacts but with full resolution. The "bob" method displays every field as individual frames. Thus, the frame rate doubles, but the spatial resolution is lost in every frame. The "discard" method discards every other field, and therefore the interlacing artifacts are completely eliminated, but half of the resolution is lost and motion does not appear as fluid. The "adaptive" method combines the "weave" and "bob" methods. It performs de-interlacing only when there are interlacing artifacts, and uses the "weave" method elsewhere.

Typically, the interlacing artifacts are detected using motion information because only regions with motion need de-interlacing. Although the "adaptive" method can achieve better performance than "weave" or "bob," the motion detection is usually computationally expensive and significantly increases the system cost. Advanced methods such as motion compensated de-interlacing methods can achieve better quality with even greater computational complexity, see U.S. Pat. Nos. 5,784,115, and 6,442,203.

To deal with the resolution mismatch, downsampling needs to be performed. Generic concatenated interpolating-decimating, as well as other more advanced methods, can be applied for this purpose, see U.S. Pat. Nos. 5,289,292, 5,335, 295, 5,574,572, 6,175,659, and 6,563,964.

FIG. 1 shows one example prior art system 100. A video decoder 110 decodes a compressed interlaced video 101 and sends decoded interlaced pictures 102 to a de-interlacer 120. De-interlaced progressive pictures 103 are downsampled 130 by a downsampling filter. Finally, the de-interlaced and downsampled pictures 104 are passed on to an encoder 140, progressive display device, or other processing. Because the downsampling 130 is performed on the full-resolution de-interlaced pictures, unnecessary additional computations can be introduced.

Consequently, there exists a need for jointly performing de-interlacing and downsampling for displaying high-resolution interlaced content on low-resolution progressive display. There is also a need for an MPEG-2 de-interlacing and downsampling system that has a comparatively low computational complexity and can improve video quality cost effectively.

SUMMARY OF THE INVENTION

The invention provides for processing a compressed input video. The compressed input video is processed to produce an interlaced picture, and macroblock coding information of the input video. The interlaced picture has a first spatial resolution, and a top-field and a bottom-field. The top-field and the bottom-field of the interlaced picture are filtered adaptively according to the macroblock coding information to produce a progressive picture with a second spatial resolution less than the first spatial resolution.

DETAILED DESCRIPTION OF THE PREFERRED EMBODIMENT

Our invention provides a system and method for jointly de-interlacing and downsampling decompressed video for display, re-encoding or other processing. We perform the de-interlacing and downsampling jointly using an adaptive frame/field filtering process. Our invention is particularly useful when the input compressed video is coded in MPEG-2 frame-pictures, which is currently the dominant video coding method for broadcasting and storage video. However, it should be understood that this invention also applies to other video coding systems other than MPEG-2 frame-pictures.

System Structure

Figure 1:
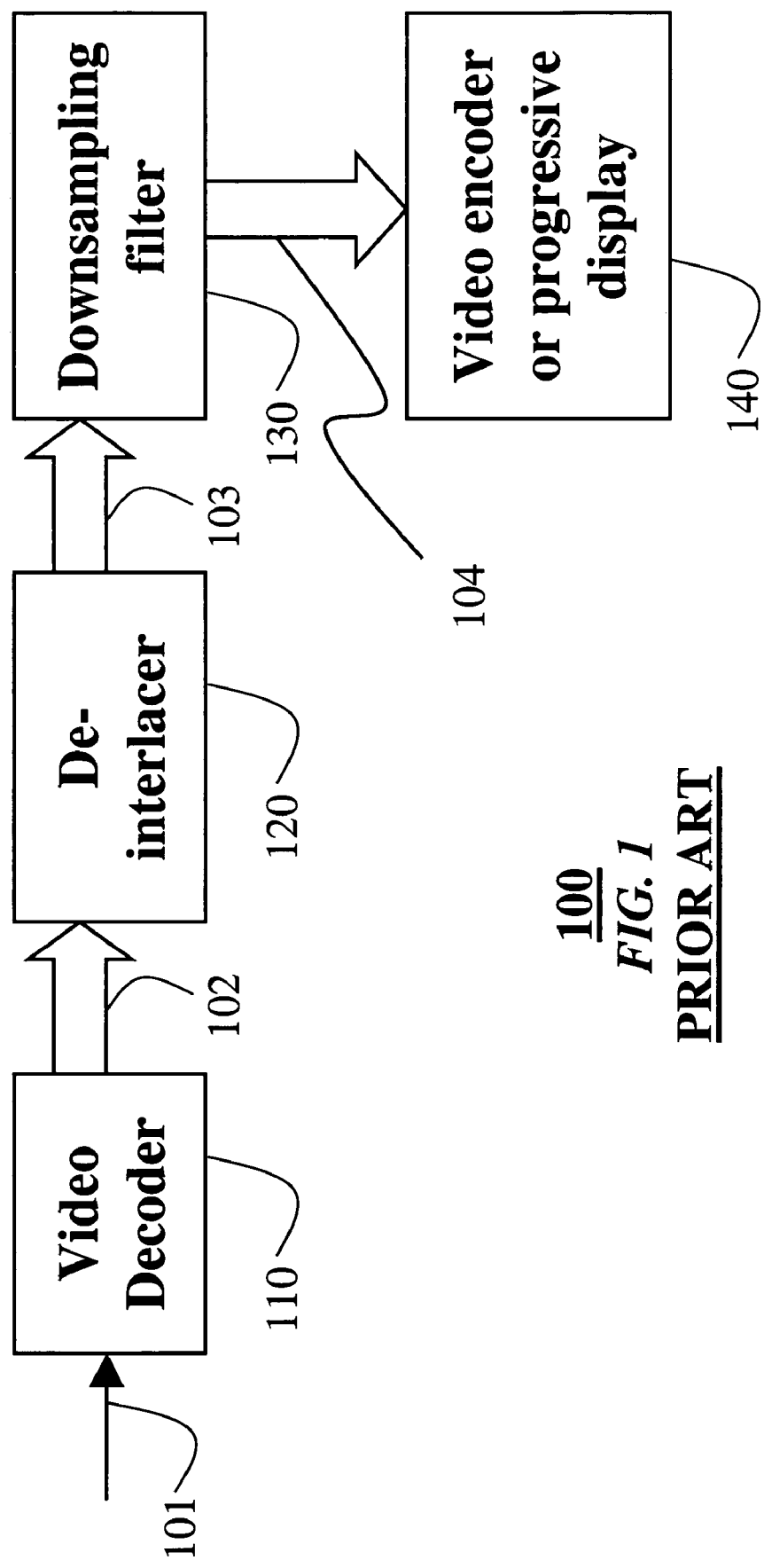
FIG. 1 is a block diagram of a prior art de-interlacer and downsampling filter.
Figure 2:
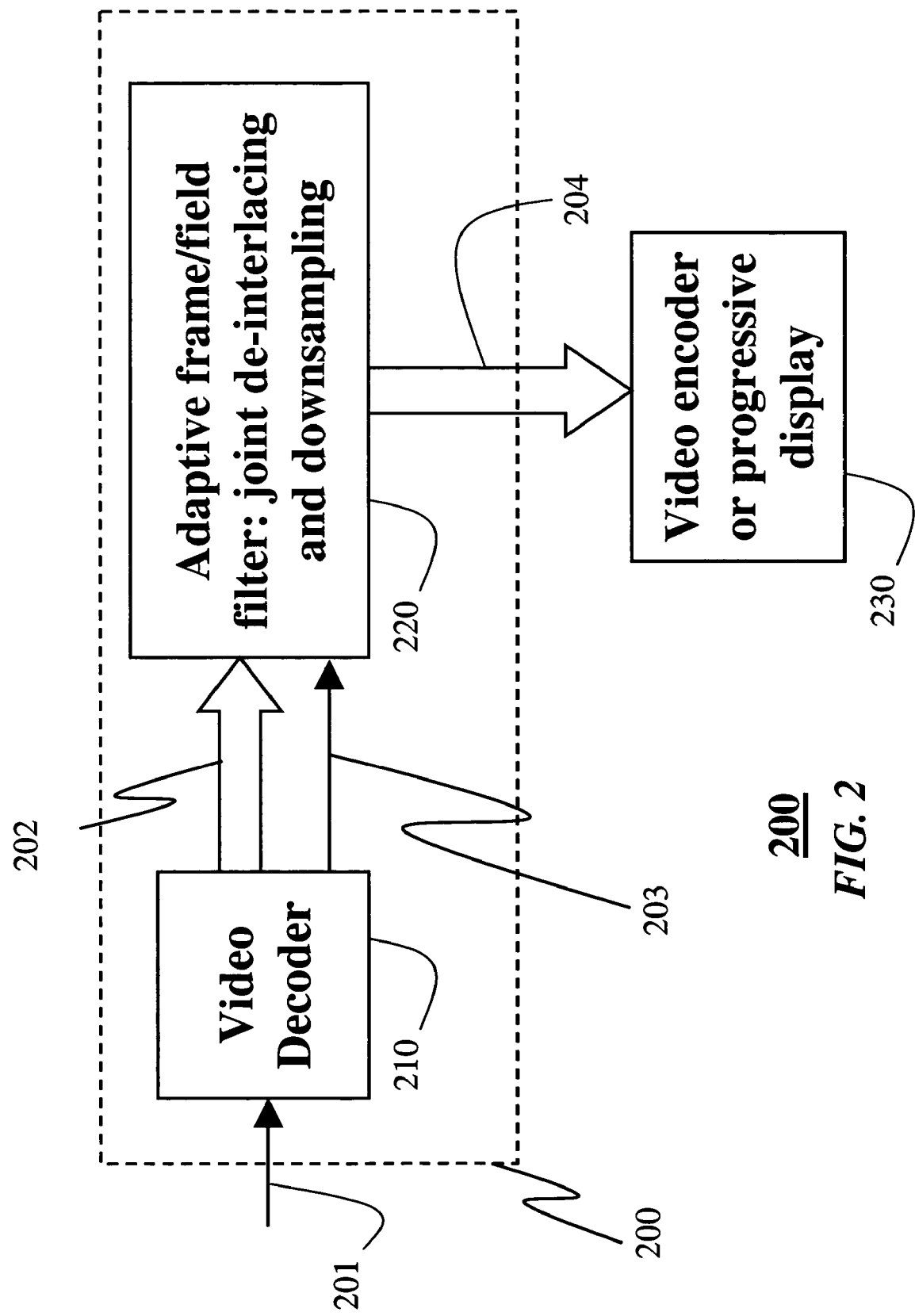
FIG. 2 is a block diagram of an adaptive filtering system according to the invention.

FIG. 2 shows an adaptive filtering system 200 that jointly performs de-interlacing and downsampling according to our invention. A video decoder 210 decodes an MPEG-2 coded interlaced video 201 and reconstructs interlaced video pictures 202 as well as side information 203, including macroblock coding-modes, coding-types and motion information.

Adaptive Filter

An adaptive filter 220 uses the side information 203 for detecting interlacing artifacts. Because the side information is associated with macroblocks, the interlacing artifacts detection and adaptive filtering 220 are also applied on a macroblock basis. Adaptive frame/field filtering is applied according to the interlacing artifacts.

Macroblock-based processing has the additional advantage of low-delay, because the filtering result 204 can be outputted immediately after a macroblock is processed. The de-interlaced and downsampled pictures 204 are then sent out for further processing 230, for example, re-encoding and displaying on a progressive display.

Frame filtering uses samples from the frame, and field filtering uses only samples from one field. Frame filtering is used at pixel regions where no interlacing artifacts are present and field filtering is used at pixel regions where interlacing artifacts do exist. Based on the side information decoded from the compressed input video 201, including coding modes and/or motion vectors, indications of interlacing artifacts for a pixel region are determined, and adaptive frame/field filtering is applied accordingly to the pixel region.

Many coding decisions encoded in the compressed MPEG-2 video stream can be useful for detecting the existence of interlacing artifacts and to make the decision whether to apply frame filtering or field filtering.

Filter Decision Method

Figure 3:
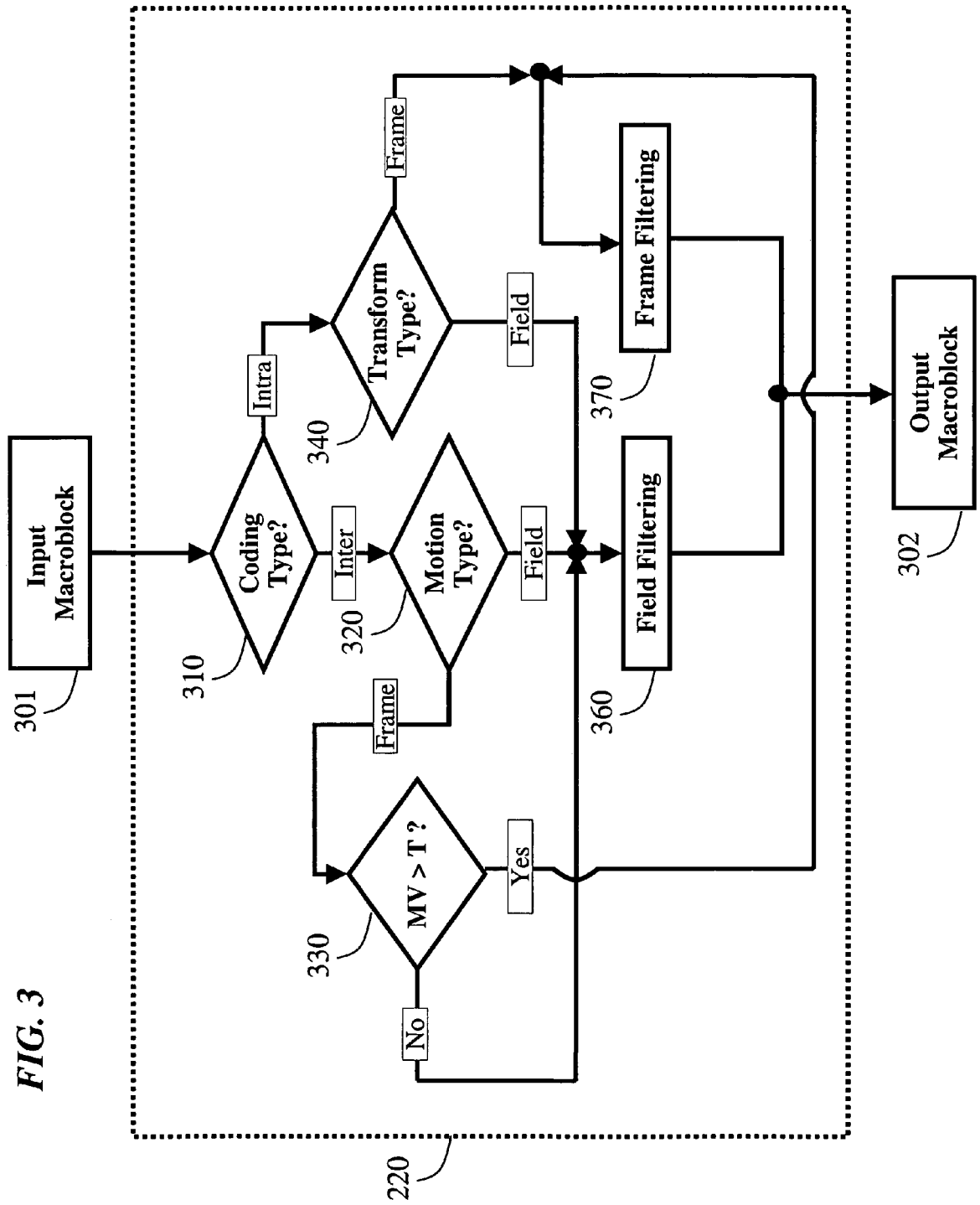
FIG. 3 is a flow diagram of an adaptive frame filtering method according to the invention.

FIG. 3 shows in detail the method 220 that uses the decoded side information 203 to make the appropriate filtering decisions. Particularly useful side information includes the macroblock-level coding-parameters that indicate the macroblock coding type and the macroblock transform type. The macroblock coding type can be either 'intra' or 'inter' including all temporally predictive-coding modes defined by the particular coding format, while the transform type can be either frame-based or field-based meaning that the transform operates on frame-block or field-block configurations of a macroblock. If the macroblock is inter-coded, a macroblock motion type is also considered during the filter decision. For the purpose of this decision, the motion type indicates whether the motion compensated prediction is frame-based or field-based.

In an embodiment in which the input video is coded in an MPEG-2 format, the MACROBLOCK_TYPE indicates the coding type, the DCT_TYPE indicates the transform type, and the MOTION_TYPE indicates the motion type. A similar mapping could be shown for the corresponding syntax elements in other video coding formats.

For intra-coded macroblocks, the use of a field-based transform, e.g., DCT_TYPE=1 in MPEG-2 syntax, tends to indicate interlacing artifacts exist. For intra-coded macroblocks, there are typically interlacing artifacts when there is motion. Therefore, field-based prediction, e.g., MOTION_TYPE="Field-based-prediction" in the MPEG-2 syntax, very likely means there are interlacing artifacts, while frame-based prediction, e.g., MOTION_TYPE="Frame-based-prediction" in the MPEG-2 syntax also indicates interlacing artifacts unless the macroblock has zero motion-vector or very small motion vector.

The interlacing artifacts detection and adaptive filtering method 220 is applied to all input macroblocks 301 in a picture to produce output macroblocks 302. Note that the input 301 to the method 220 is comprised of actual video data 202 and side information 203 of each macroblock.

The first decision in the method 220 is to determine 310 the coding type. If the type is inter-coded, determine 320 the motion type. For inter-coded macroblocks, if the motion type is field-based, then apply field-based filtering 360 to produce the output macroblock 302. However, if the motion-type is frame-based, then determine 330 whether the magnitude of motion vectors (MV) is greater than a threshold (T), where the threshold may be set to zero or a non-zero value. For the case when the macroblock is inter-coded and the motion type is frame based, we apply field-based filtering 360 if MV is less than or equal to T, and frame-based filtering 370 when MV is greater than T.

On the other hand, if the coding type 310 is intra-coded, determine 340 the transform type. For intra-coded macroblocks, if the transform type 340 is field-based, then apply field-based filtering 360 to produce output macroblock 302. However, if the transform type 340 is frame-based, then apply frame-based filtering 370 to produce the output macroblock 302.

Frame/Field Filtering

Figure 4:
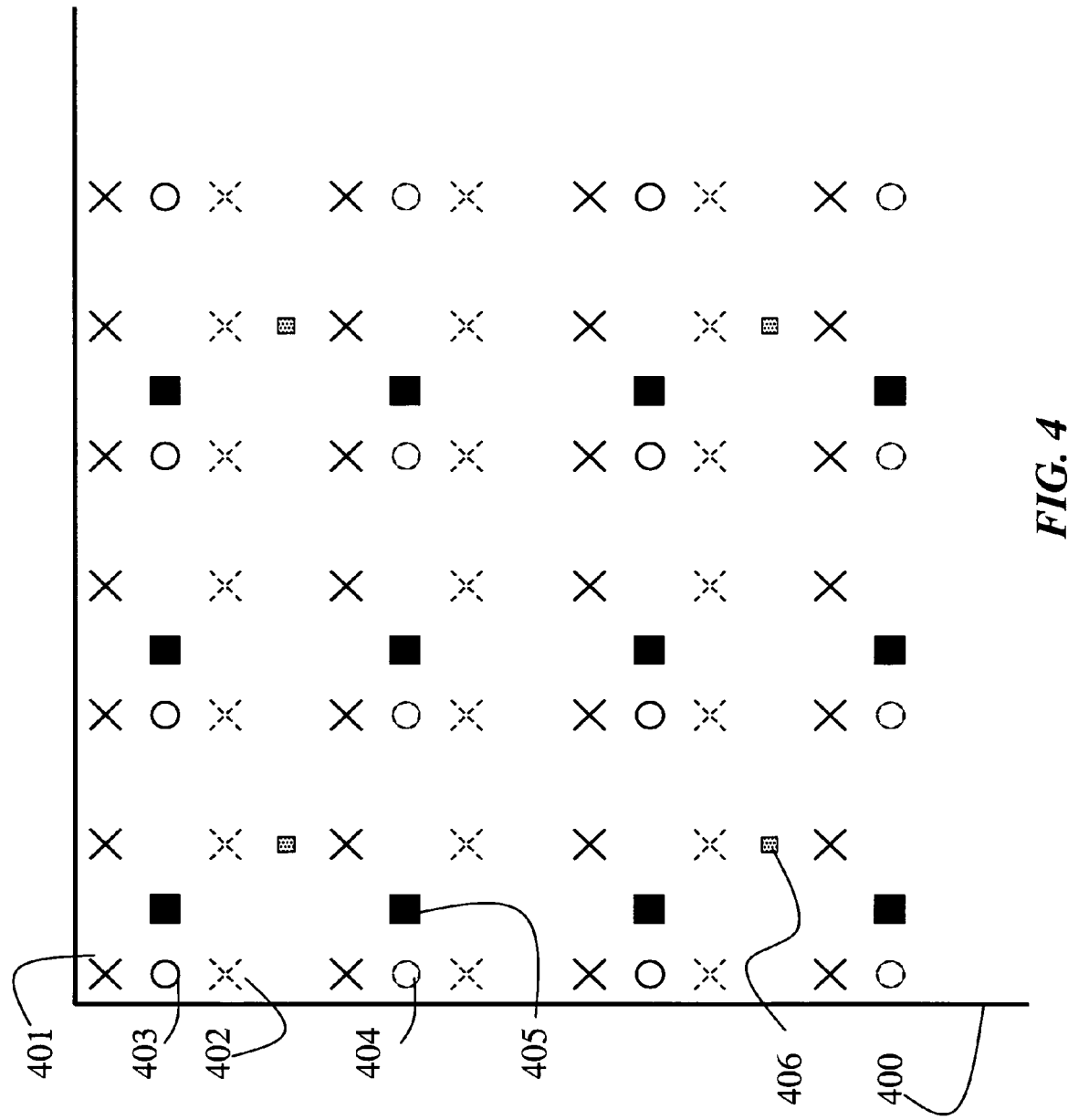
FIG. 4 is a block diagram of relative positions of luma and chroma samples before and after adaptive filtering according to the invention.

FIG. 4 shows one example of relative sample-positions of a partial macroblock 400 before and after filtering, where a down-sampling ratio of 2 in both the horizontal and vertical dimensions is assumed. In FIG. 4, the symbols are luma-input/top-field 401, luma-input/bottom-field 402, chroma-input/top-field 403, chroma-input/bottom-field 404, the luma-output 405, and the chroma-output 406. The frame-based or field-based filtering produces output samples in a lower-dimension sampling grid. The positions of the output samples effectively depend on the filter coefficients that are used to process the input pixel values. It is desirable to perform the filtering so that the relative positions of output luma and chroma samples are maintained, i.e., the structure of the output sampling grid is the same as the structure of the input sampling grid, but with less resolution.

Figure 5:
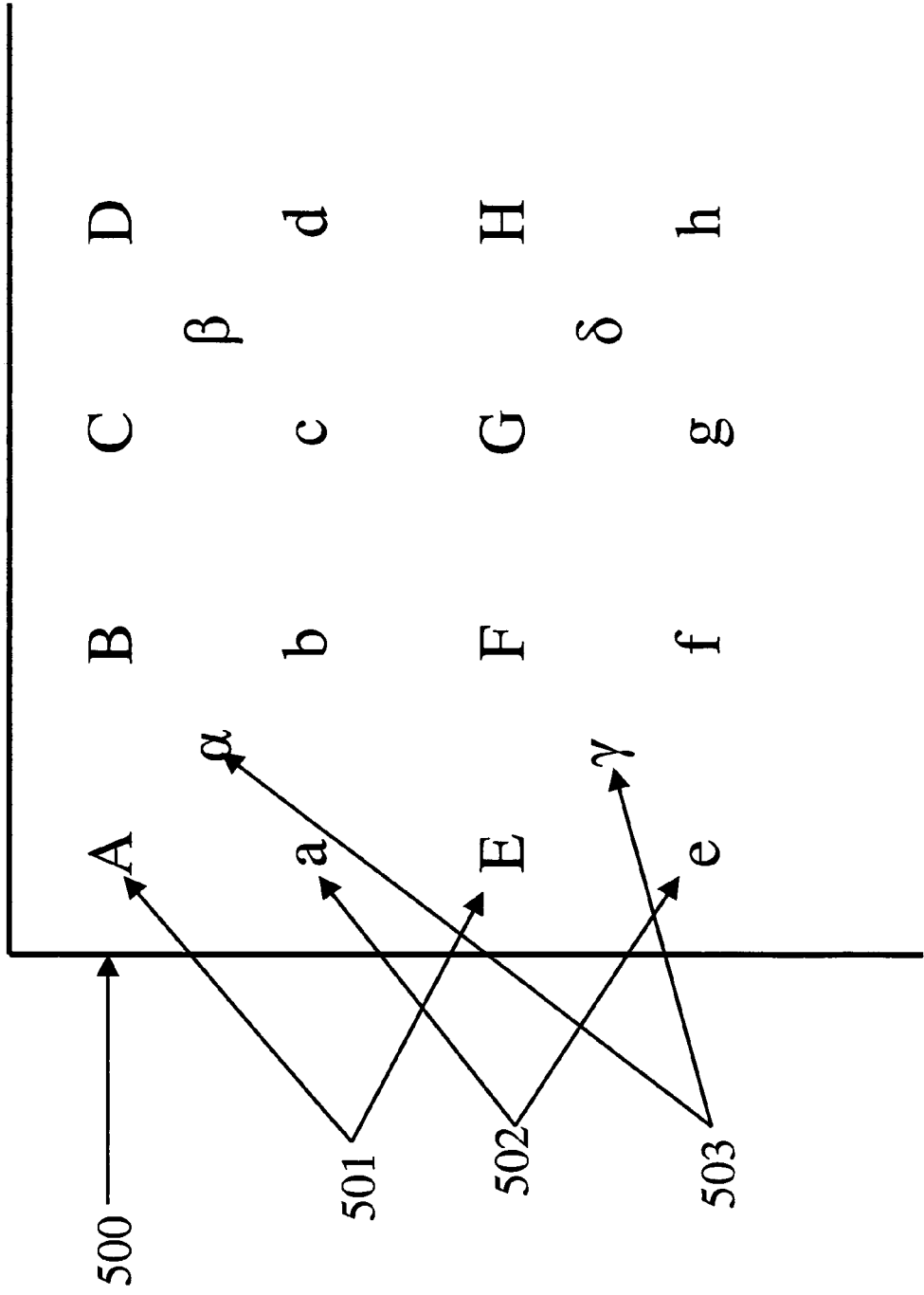
FIG. 5 is a block diagram frame filtering and field filtering to produce the output samples of FIG. 4.

FIG. 5 shows examples of frame-based and field-based filtering operations that can achieve this output positioning for a down-sampling ratio of 2 in both the horizontal and vertical dimensions. In FIG. 5, a portion 500 of a macroblock is shown. Symbols A, B, C, D, E, F, G, H 501 indicates input samples of the top field, symbols a, b, c, d, e, f, g, h 502 are input samples of the bottom field, symbols $\alpha, \beta, \gamma, \delta$ 503 are output samples. Then, using bilinear interpolation, the frame filtering is performed according to $\alpha=(A+B+a+b)/4$, and field filtering according to $\alpha=(3\times(A+B)+E+F)/8$. Likewise, other output samples can be computed from input samples.

For the case with down-sampling ratio other than 2 in horizontal and/or vertical dimensions, adaptive filter coefficients and output sample positions are determined so that the structure of the output sampling grid is the same as the structure of the input sampling grid, but with less resolution. As with the down-sampling by a factor of 2, bilinear interpolation is used to determine the filter coefficients, i.e., weighting factors, that are applied to input samples. More sophisticated filters with improved frequency response that also provide output samples at the desired sample positions may also be used.

It is to be understood that various other adaptations and modifications can be made within the spirit and scope of the invention. Therefore, it is the object of the appended claims to cover all such variations and modifications as come within the true spirit and scope of the invention.

We claim:

1. A method for processing a compressed input video, comprising:
    decoding the compressed input video to produce pixels of an interlaced picture, the interlaced picture having a first spatial resolution, and a top-field and a bottom-field;
    producing, for each macroblock of pixels in the interlaced picture, a macroblock coding type, in which the macroblock coding type includes a macroblock motion type and a macroblock transform type;
    filtering adaptively the top-field and the bottom-field of the interlaced picture according to the macroblock coding type and the macroblock transform type to produce a progressive picture with a second spatial resolution less than the first spatial resolution, in which the filtering jointly performs de-interlacing and downsampling of the interlaced picture;
    wherein, the filtering includes frame-based filtering and field-based filtering, in which the filtering is frame-based when the macroblock coding type is inter-coding and the macroblock motion type is frame-based, and an absolute value of motion vectors corresponding to the macroblock are greater than a threshold; and
    encoding the progressive picture.

2. The method of claim 1, in which the macroblock coding type includes intra-coding and inter-coding.

3. The method of claim 1, in which the macroblock transform type includes a frame-based transform and a field-based transform.

4. The method of claim 1, in which the macroblock coding type further includes a macroblock motion type and corresponding motion vector when the macroblock coding type is inter-coding.

5. The method of claim 4, in which the macroblock motion type includes frame-based and field-based.

6. The method of claim 1, in which the filtering is field-based when the macroblock coding type is inter-coding and the macroblock motion type is field-based.

7. The method of claim 1, in which the filtering is field-based when the macroblock coding type is inter-coding, the macroblock motion type is frame-based, and an absolute value of motion vectors corresponding to the macroblock are less than or equal to a threshold.

8. The method of claim 7, in which the threshold equals zero.

9. The method of claim 7, in which the threshold is greater than zero.

10. The method of claim 1, in which the filtering is field-based when the macroblock coding type is intra-coding and the macroblock transform type is field-based.

11. The method of claim 1, in which the filtering is frame-based when the macroblock coding type is intra-coding and the macroblock transform type is frame-based.

12. The method of claim 1, in which the filtering is frame-based and operates on input samples from the top-field and bottom-field of the interlaced picture.

13. The method of claim 1, in which the filtering is field-based and operates on input samples from the top-field or bottom-field.

14. The method of claim 1, in which the filtering is field-based and operates on input samples from the bottom-field.

15. The method of claim 1, in which the encoding compresses the progressive picture.

16. The method of claim 1, further comprising:
    rendering the progressive picture on a display device.

17. A system for processing a compressed input video, comprising:
    means for decoding the compressed input video to produce pixels of an interlaced picture, and producing, for pixels of each macroblock, a macroblock coding type, in which the macroblock coding type includes a macroblock motion type and a macroblock transform type, the interlaced picture having a first spatial resolution, and a top-field and a bottom-field;
    means for filtering adaptively the top-field and the bottom-field of the interlaced picture according to the macroblock coding type and the macroblock transform type to produce a progressive picture with a second spatial resolution less than the first spatial resolution, in which the filtering jointly performs de-interlacing and downsampling of the interlaced picture, wherein, the filtering includes frame-based filtering and field-based filtering, in which the filtering is frame-based when the macroblock coding type is inter-coding and the macroblock motion type is frame-based, and an absolute value of motion vectors corresponding to the macroblock are greater than a threshold; and
    an encoder configured to compress the progressive picture.

* * * * *